US005896258A

United States Patent [19]

Cotton et al.

[11] Patent Number: 5,896,258

[45] Date of Patent: Apr. 20, 1999

[54] OIL CIRCUIT RECLOSER OPERATOR

[75] Inventors: Ross Alexander Cotton, Shanty Bay; Brian John Holmes, Oro Station; Jack Robert Strikwerda, Minesing; Larry William Lynn, Midland; Barry Mitchell, Stroud; Peter Morrill, Mississauga, all of Canada

[73] Assignee: Ontario Hydro, Toronto, Canada

[21] Appl. No.: 08/978,477

[22] Filed: Nov. 25, 1997

[30] Foreign Application Priority Data

Nov. 25, 1996 [CA] Canada ................................ 2191140

[51] Int. Cl.$^{6}$ ................................ H02H 3/00

[52] U.S. Cl. ................................ 361/71; 361/93; 361/115

[58] Field of Search ................................ 361/71, 72, 73, 361/93, 115

[56] References Cited

U.S. PATENT DOCUMENTS 3,878,436 4/1975 Bogel ................................ 361/71

*Primary Examiner*—Jeffrey Gaffin
*Assistant Examiner*—Stephen Jackson
*Attorney, Agent, or Firm*—Pennie & Edmonds LLP

[57] ABSTRACT

A circuit recloser that limits current through a power line when a fault condition occurs. The recloser includes a circuit interrupter that is switchable between a closed state, in which current is permitted to flow through the power line, and an open state, in which the current is interrupted. The interrupter switches to its open state in response to a fault condition, such as a current surge. The recloser also has a movable member that is operatively coupled to the interrupter for resetting the interrupter to the closed state from the open state when the movable member is moved. The movable member is configured for being remotely movable to close the interrupter. Preferably the recloser includes an electric drive to remotely move the movable member from a remote station, and a projection extends from the movable member to enable manual movement thereof. The movable member includes a shaft which the electric drive rotates by turning a slotted hub coaxially about the shaft. When hub rotates, ends of slots in the hub contact a drive pin that extends radially from the shaft. The slots allow manual rotation of the shaft without damaging the electric drive. Microswitches sense the position of the hub during its rotation.

22 Claims, 4 Drawing Sheets

OIL CIRCUIT RECLOSER OPERATOR

FIELD OF THE INVENTION

The invention relates to circuit reclosers which open an electrical power circuit during abnormal conditions and then automatically reclose the circuit after a brief interval of time.

BACKGROUND OF THE INVENTION

Electric power distribution lines are occasionally subjected to lightning strikes or grounding. Lightning strikes and groundings result in a sudden surge of electric current through the power lines. These sudden current surges may damage transformers, power lines and other related equipment in the electric power distribution grid. Since sudden surges of current, caused by lightning strikes or grounded power lines, usually last for only a fraction of a second, standard circuit breakers cannot be used to limit the current on the distribution lines because they shall keep the circuit open even though the fault condition has passed. Automatic circuit breakers, referred to as reclosers, are used in place of standard circuit breakers for protecting transmission lines against current surges.

Reclosers are designed to open a circuit when a current surge is sensed and then reclose the circuit within a few moments. When a recloser device is used to limit current flow through electric power lines, sudden current flows resulting from a lightning strike or a downed power line causes contacts within the recloser to separate, thereby opening the circuit and limiting the current flow. After opening the circuit, the recloser is designed to wait an interval of time, approximately one second in most cases, before bringing the internal contacts back together to close the circuit. If the current is still too high, the recloser opens the circuit again, thereby limiting the current through the lines. Again, the recloser closes the circuit after a few moments. Reclosers are designed to successively reclose only a few times, typically three times, before going into an open circuit configuration. In the open circuit configuration, the recloser remains open and can only be closed by physically turning a lever located on its surface.

In many cases, a fault condition may place several reclosers along an electric power line in their open circuit configuration This requires workers to travel to each of the reclosers to reset them back into their closed circuit configuration. The time and effort required to reset all of the reclosers along the distribution lines can add significantly to the cost and delay of restoring electrical power after a failure.

DISCLOSURE OF THE INVENTION

The present invention is directed at a recloser device for limiting the current on a power line when a fault condition occurs, the recloser having an interrupting means for interrupting the current. The interrupting means is switchable between a closed state, where current flows through the lines, and an open state where the current is interrupted. The device also has a member operatively coupled to the interrupting means. The interrupting means being able to move the movable member from a first position to a second position when the interrupting means switches from its closed state to its open state. The movable member is also able to reset the interrupting means from its open state to its closed state when the movable member is moved from its second position to its first position. The device also includes a means for remotely moving the movable member from its second position to its first position, the remote moving means being operatively coupled to the movable member.

The present invention is also directed at a device for converting a standard recloser to a remotely activatable recloser. The standard recloser has a movable member which is moved from a first position to a second position when the recloser switches from its closed to its open state. The movable member can reset the recloser back into its closed state by moving from the members second position to its first position. The converting device itself includes a housing mountable to the recloser at a position on the recloser adjacent to the movable member. The converting device also includes a remote moving means mounted to the housing and being able to operatively couple with the member. The remote moving means is adapted to move the member from its second position to its first position.

BRIEF DESCRIPTION OF THE DRAWINGS

Further features and advantages of the method and device embodying the present invention will now be described and made clearer from the ensuing description, reference being had to the accompanying drawings, in which.

DETAILED DESCRIPTION OF THE PREFERRED EMBODIMENT

Figure 1:
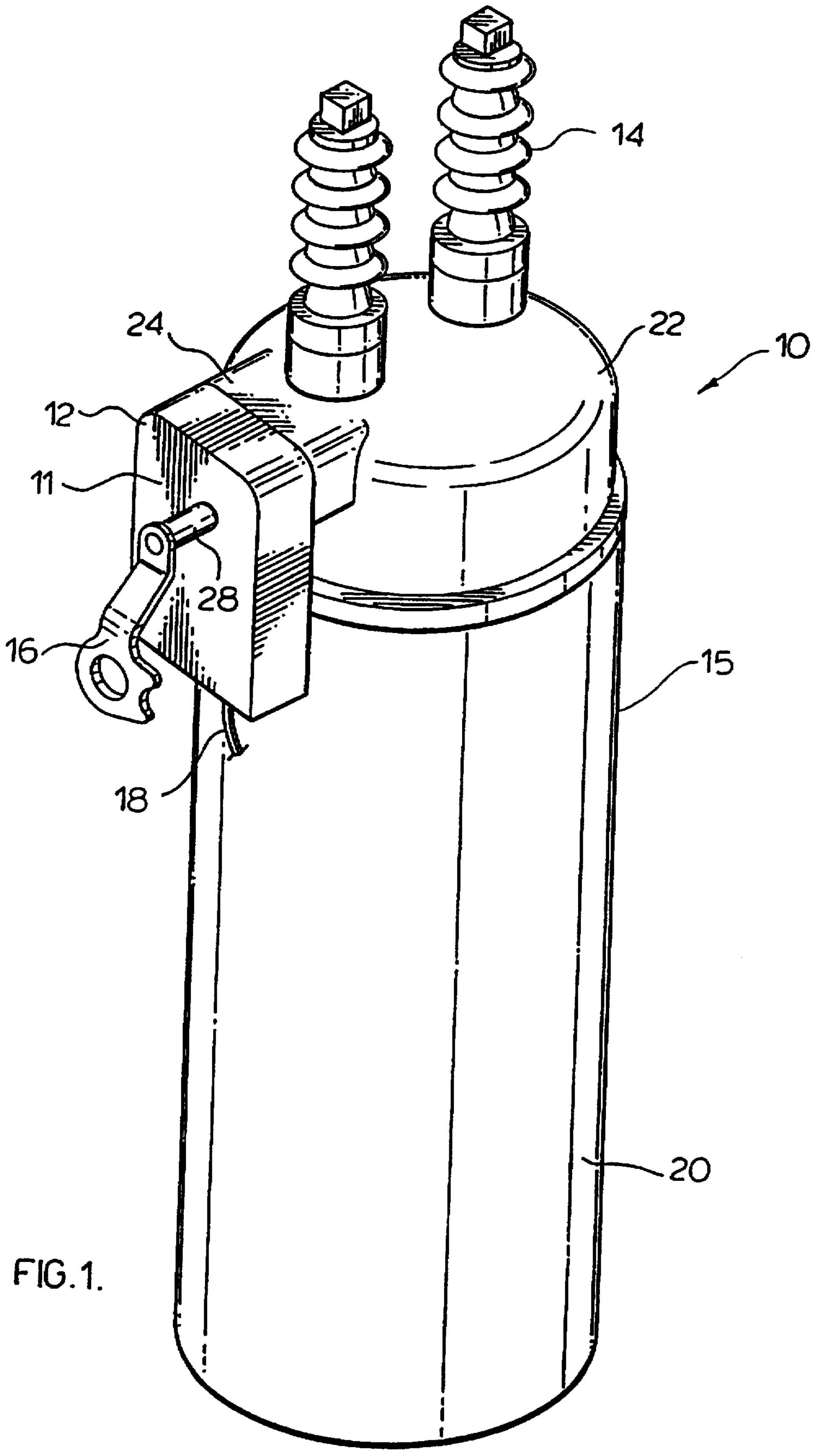
FIG. 1 is a perspective view of the preferred embodiment of the invention.

Referring firstly to FIG. 1, the remotely activated recloser, shown generally as item 10, comprises a remotely activated recloser control device 12 having cover 11 mounted to a standard circuit recloser shown generally as item 15. Circuit recloser 15 has tank portion 20, head casting 22, insulated bushings 14, switch lever 16 and sleet hood 24. Insulated bushings 14 are connectable to electrical power lines (not shown). Tank portion 20 contains a pair of electrical contacts (not shown) suspended in electrically insulating oil. The electrical contacts are operatively coupled to insulated bushings 14. The recloser interrupts the current through the line by means of opening the electrical contacts.

Under normal operating conditions, the electrical contacts are in physical contact with each other and current can flow through the electrical power lines coupled to insulated bushings 14 and the recloser is said to be in its closed configuration. When the electric current exceeds a predetermined level, an electromagnet inside tank portion 20 physically separates the electrical contacts, thereby opening the circuit and interrupting the current flow. The electrical contacts are biased towards each other by a spring; therefore, after a brief moment of time the contacts are brought back into physical contact. If the fault condition is long lasting, then the electrical contacts shall separate and recloser 15 is placed into its open circuit configuration wherein the electrical contacts are placed into a stable position where they no longer make physical contact with each other.

Switch lever 16 is operatively coupled to the internal electrical contacts via a rotatable operating shaft 28 which in turn is operatively coupled to the electrical contacts. Operating shaft 28 passes through sleet hood 24 and into head casting 22. When recloser 15 is in its open circuit configuration, switch lever 16 and shaft 28 are usually in a vertical position as shown in FIG. 1. When recloser 15 switches from its open circuit configuration to its closed circuit configuration, operating shaft 28 rotates into a second position. Switch lever 16 is approximately in a horizontal position when recloser 15 is in its closed circuit configuration. Since switch lever 16 is rigidly connected to operating shaft 28, moving the switch lever from its vertical position to its horizontal position causes operating shaft 28 to rotate and forces the electrical contacts back into their closed circuit configuration.

Figure 2:
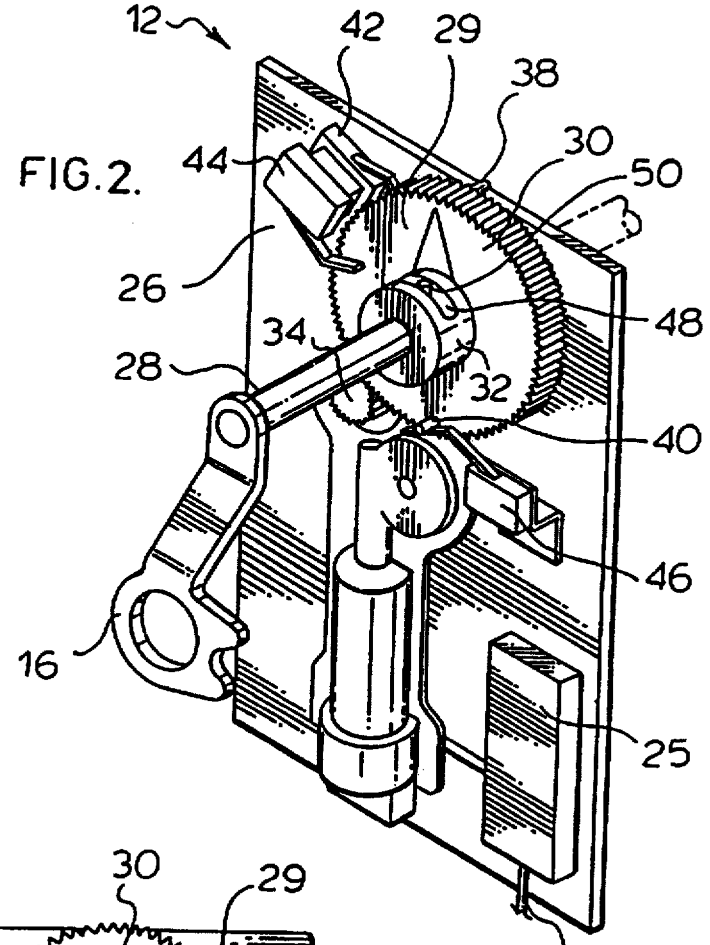
FIG. 2 is a perspective view of the control device of the present invention showing the switch operating lever in its first position.
Figure 3:
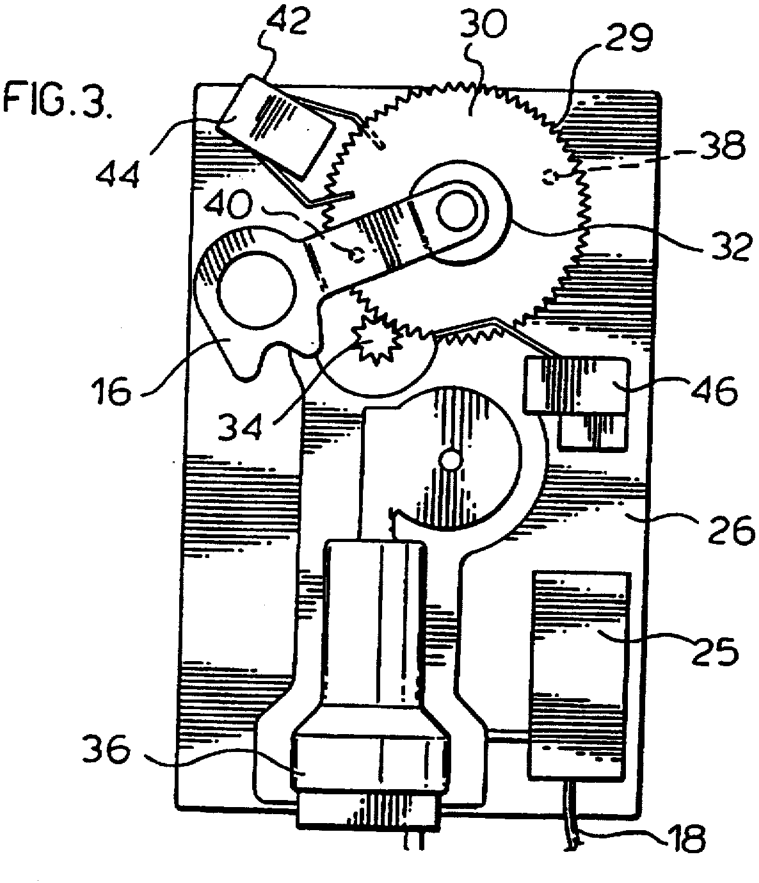
FIG. 3 is a front view of the control device of the present invention showing the switch operating lever in a position between its first and second positions.

Referring now to FIGS. 2 and 3, recloser control device 12 comprises mounting plate 26, drive motor 36, drive motor control interface 25 and cable 18 and lever member 29. Mounting plate 26 is rigidly connected to sleet hood 24 via bolts or some other suitable means. Drive motor 36 is operatively coupled to operating shaft 28 by lever member 29 and can rotate operating shaft between its open circuit configuration as shown in FIG. 2 to its closed circuit configuration as shown in FIG. 3. Lever member 29 provides motor 36 with a mechanical advantage. Lever member 29 comprises shaft gear 30 having shaft gear hub 32. Shaft gear hub 32 is preferably integral with shaft gear 30, and both are rotatably mounted to operating shaft 28 such that the shaft gear and the hub can be rotated freely about the operating shaft. Drive motor 36 is rigidly mounted to mounting plate 26 and has drive gear 34. Drive gear 34 meshes with shaft gear 30 such that when the drive means is activated the drive gear can be rotated in either direction. Mounted onto one side of shaft gear 30 is first activator 38. Second activator 40 is mounted to the other side of shaft gear 30 opposite first activator 38. First microswitch 42, second microswitch 44 and third microswitch 46 are mounted to mounting plate 26 around the periphery of shaft gear 30.

Figure 6:
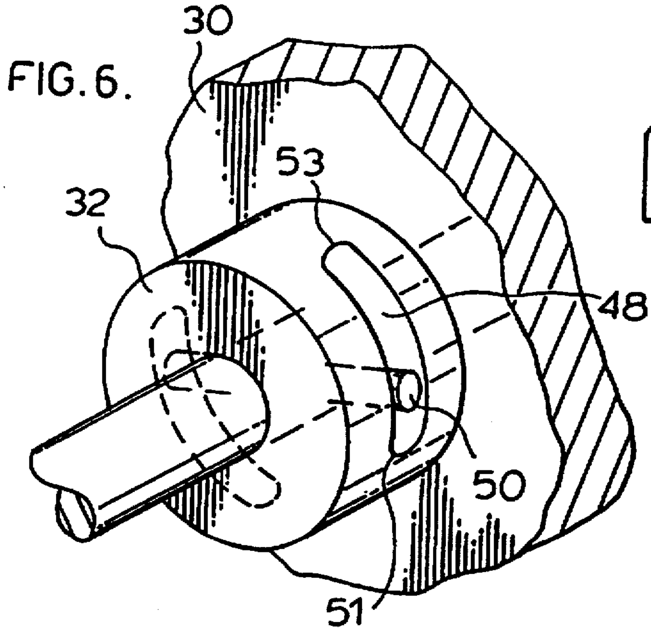
FIG. 6 is a perspective view of a portion of the control device of the present invention.

Referring to FIG. 2, hub 32 has a groove or slot 48 passing therethrough. Operating shaft 28 has a protruding drive pin 50 rigidly mounted thereto. Drive pin 50 is dimensioned to fit within slot 48 in a tongue in groove fashion. As best seen in FIG. 6, drive pin 50 extends through both sides of operating shaft 28. Since shaft gear 30 and hub 32 are rotatably mounted to operating shaft 28, shaft gear 30 can rotate freely in either direction relative to the operating shaft until drive pin 50 makes contact with edges 51 and 53 of the hub adjacent slot 48. Slot 48 is dimensioned so that shaft gear 30 can rotate approximately 90° relative to operating shaft 28 before drive pin 50 comes in contact with either edges 51 or 53. Slot 48 and drive pin 50 form a limiting means for limiting the free rotation of shaft 28 relative to shaft gear 30. If shaft gear 30 is rotated in either direction more than 90° degrees, then it shall rotate operating shaft 28. Likewise, shaft gear 30 can be rotated into a position such that operating shaft 28 can freely rotate 90° in one direction.

Figure 4:
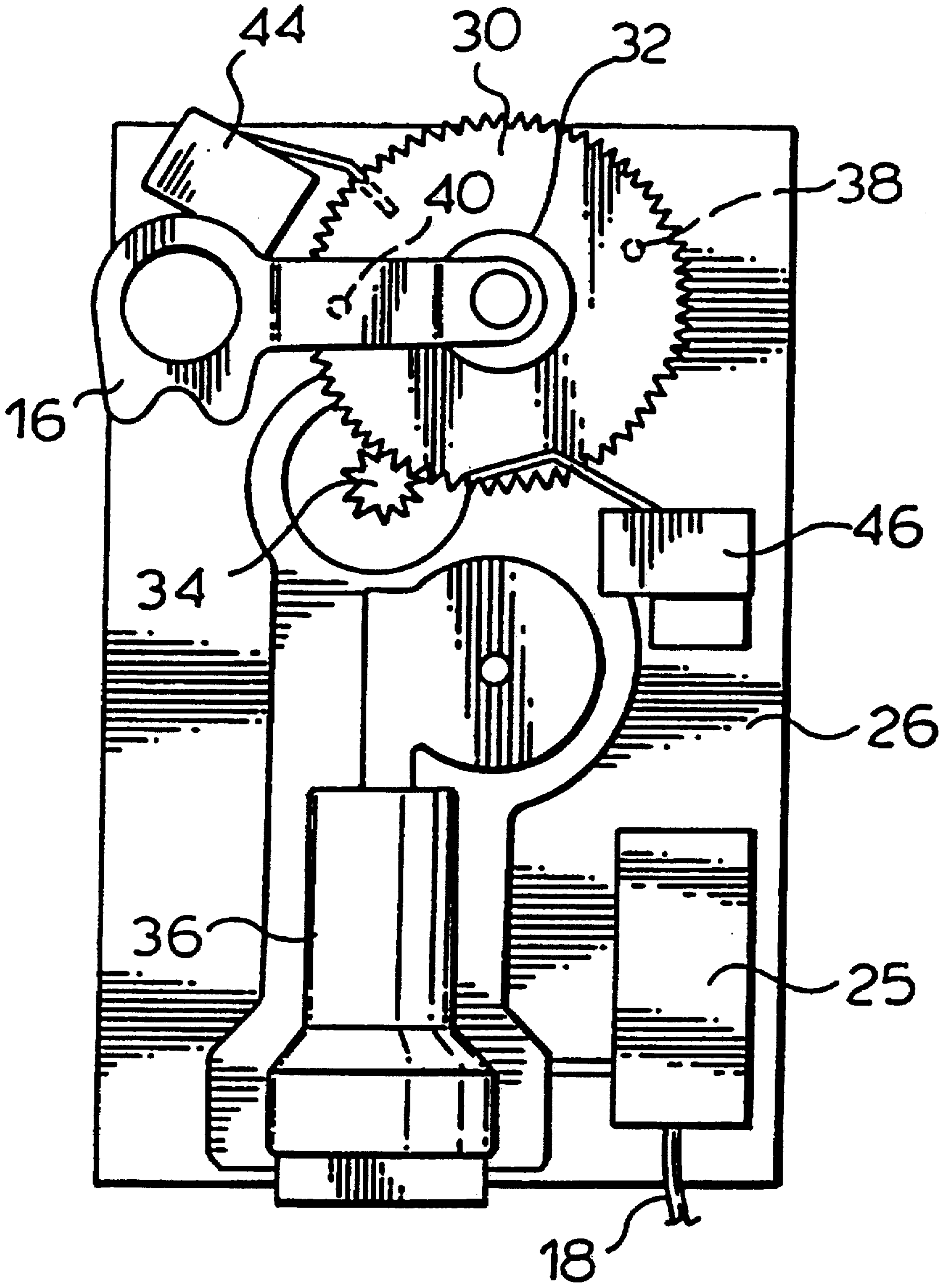
FIG. 4 is a front view of the control device of the present invention showing the switch operating lever in its second position.

Referring now to FIGS. 2, 3 and 4, drive motor 36 is controlled by motor control interface 25, which in turn is operatively coupled to a remote operator via communication cable 18. Motor control interface 25 forms a means for coupling drive motor 36 with a remote operator. Motor control interface 25 controls how many degrees and in which direction drive motor 36 turns shaft gear 30. Drive motor 36 is sufficiently powerful, and the mechanical advantage provided by the relative diameters of drive gear 34 and shaft gear 30 is sufficiently high that the drive motor can rotate operating shaft 28 between its horizontal position as shown in FIG. 3, wherein recloser 9 is in its closed circuit configuration, to the shafts vertical position as shown in FIG. 2, wherein the recloser is in its open circuit configuration. The position of shaft gear 30 is measured by a position locator means comprising microswitches 42, 44 and 46 and first and second activators 38 and 40. Microswitches 42, 44 and 46 are operatively coupled to motor control interface 25. As shaft gear 30 rotates from one position to another, activators 38 and 40 trip microswitch 42 and microswitches 44 and 46 respectively, thereby indicating the position of the shaft gear to motor control interface 25.

Figure 5:
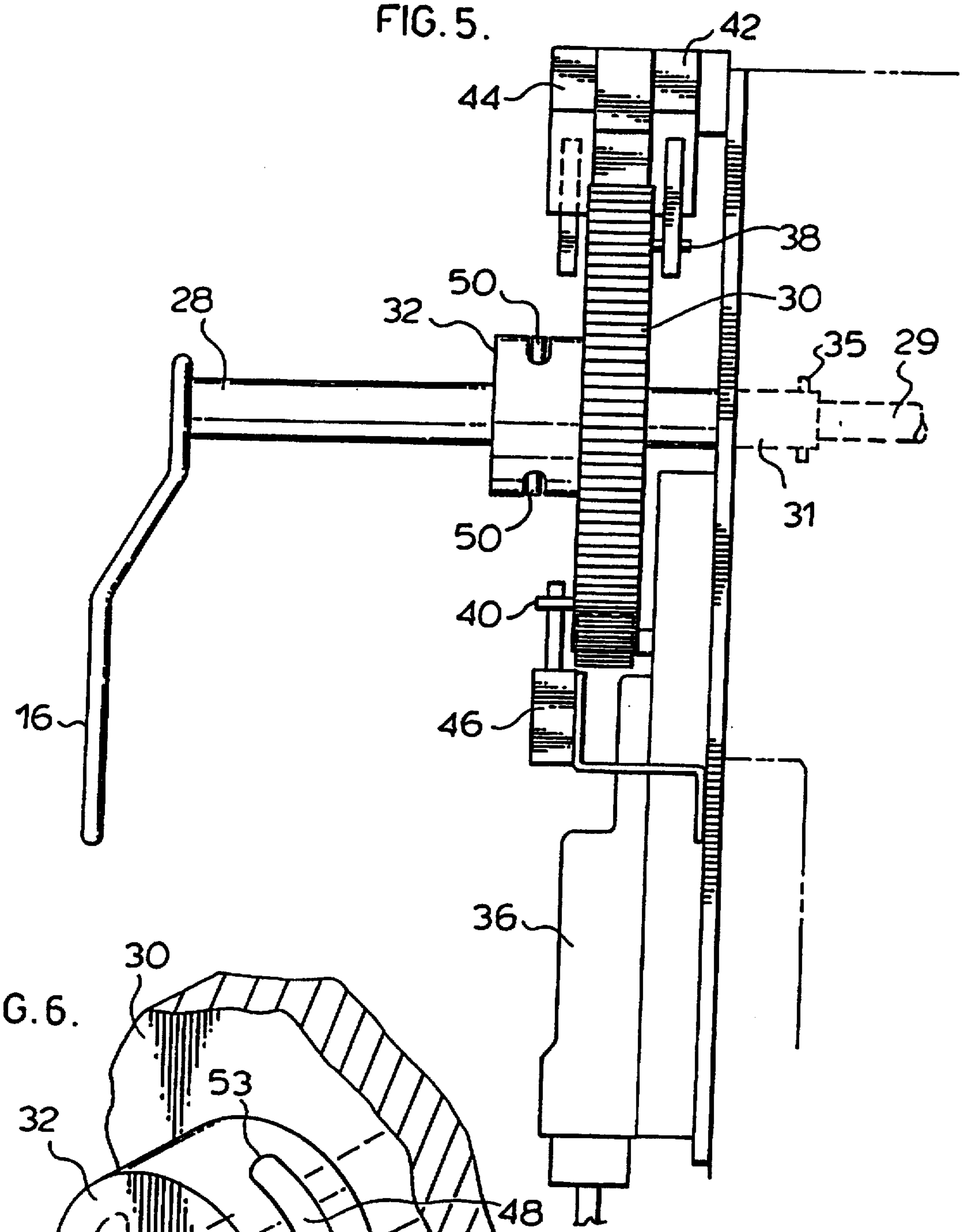
FIG. 5 is a side view of the control device of the present invention.

Referring to FIG. 5, recloser control device 12 may be attached to any standard manually operated recloser 15. To attach recloser control device 12, switch operating lever 16 is first removed and a shaft extender 31 is attached to the existing recloser shaft 29 to form operating shaft 28. One end of shaft extender 31 is configured to rigidly mount to the end of existing recloser shaft 29. Pin 35 may be attached to the ends of shaft extender 31 and existing recloser shaft 29 to maintain a rigid connection between the two shafts. Cover 11 of recloser control device 12 is removed and the control device is mounted to sleet hood 24 such that operating shaft 28 is inserted through shaft gear 30. Drive pin 50 is then attached to operating shaft 28 and mounting plate 26 is bolted to sleet hood 24. Cover 11 is mounted to mounting plate 26. Handle 16 may then be attached to shaft 28 opposite shaft 29.

Referring now to FIGS. 2, 3 and 4, the operation of the recloser device shall be explained. When a fault conditions occurs recloser 15 enters its open state, the current through the power lines is interrupted and operating shaft 28 rotates into its open state position. After the fault condition is cured, an operator at a site remote from the automatic recloser device will send an electrical signal down communication cable 18 to the recloser control device 12. The recloser control device will then engage motor 36 which in turn shall rotate gear 30. When gear 30 reaches the limit of its free rotation, it shall in turn cause the rotation of operating shaft 28 from its open position to its closed position. The microswitches sense the relative position of gear 30 and, when operating shaft 28 is in its closed configuration, control unit 25 stops motor 36. Control unit 25 then causes drive motor 36 to rotate gear 30 in the opposite direction until it reaches the limit of gear 30's free rotation relative to shaft 28. This will permit shaft 28 to freely rotate into its open configuration if an additional fault condition occurs. The remote operator may also wish to switch the recloser from its closed configuration to its open configuration simply by sending an appropriate signal down communication cable 18. This will cause control unit 25 to engage drive motor 36 so that drive motor 36 rotates gear 30 and thereby rotates shaft 28 from its closed position towards its open position. On occasion, a repair crew working close to the recloser may wish to switch the recloser either into its closed state or into its open state. The repair crew can switch the recloser by engaging switch lever 10. The fact that gear 30 can freely rotate about shaft 28 to within certain limits permits shaft 28 to move between its open position and its closed position without damaging either the shaft or drive motor 36.

The invention having been so described, certain modifications and adaptations will be obvious to those skilled in the art. The invention includes all such modifications and adaptations which follow in the scope of the appended claims.

We claim:

1. A recloser device for limiting the current on a power line when a fault condition occurs, comprising:

a) an interrupting means for interrupting the current on the power line, said interrupting means switchable between a closed state wherein current is permitted through the power line and an open state wherein the current is interrupted, the interrupting means being able to enter its open state from its closed state when the fault condition occurs;

b) a movable member operatively coupled to the interrupting means, the interrupting means being able to move the movable member from a first position to a second position when the interrupting means switches from it closed state to its open state, the movable member re-setting the interrupting means from its open state to its closed state when the movable member is moved from its second position to its first position;

c) means for remotely moving the movable member from its second position to its first position, said means for remotely moving being operatively coupled to the movable member; and d) a projecting lever fixed to the movable member and arranged to manually move the movable member between said first and second positions, wherein the movable member comprises a shaft adapted to rotate between movable member's first and second positions, said shaft having a hub rotatable mounted thereon.

2. A recloser device as defined in claim 1 wherein the means for remotely moving comprises an electric drive comprising an electric motor operatively coupled to said hub, said electric drive having a means for operatively coupling the electric drive to a remote station such that said remote station can activate the electric drive to reset the recloser.

3. A device as defined in claim 2 wherein the means for coupling the electric drive to a remote station comprises an electronic interface coupled to the electric motor, the electronic interface being couplable to the remote station by a communication line.

4. A recloser device as defined in claim 1 wherein the hub is rotatably mounted to the shaft and the shaft and hub are adapted and configured to permit the shaft to freely rotate within the hub when the movable member rotates from its first position to its second position, the hub and shaft being further adapted and configured to permit the hub to engage the shaft and rotate the shaft from its second position to its first position.

5. A recloser device as defined in claim 4 wherein the shaft and hub are provided with a rotation limiting means to permit the shaft and hub to freely rotate relative to each other between a first and second limit, the rotation limiting means configured such that rotating the hub past the first limit causes the hub to engage the shaft and rotate the shaft towards the shafts first position, and rotating the hub towards the second limit causes the hub to engage the shaft and rotate the shaft towards its second position.

6. A device defined in claim 5 wherein the rotation limiting means comprises a tongue in groove connection between the shaft and the hub, the edges of the groove limiting the relative rotation of the hub and shaft.

7. A recloser device as defined in claim 5 further comprising a sensing means for sensing the position of the hub.

8. A device as defined in claim 7 wherein the means for coupling the electric drive to a remote station comprises an electronic interface coupled to the electric motor, the electronic interface being couplable to the remote station by a communication line, the electronic interface being coupled to the sensing means, and the electric drive being able to rotate the hub in either direction.

9. A device for converting a manually re-settable recloser to a remotely re-settable recloser, said manually re-settable recloser having a movable member for resetting the recloser from an open state wherein the recloser interrupts the current through a power line coupled to the recloser, to a closed state wherein current is permitted through the power line, said movable member moving from a first position to a second position when the recloser switches from its closed state to its open state, the movable member resetting the recloser when the movable member is moved from its second position to its first position, said device for converting comprising:

a) a housing attachable to the recloser at a location on the recloser adjacent to the movable member, b) remote moving means mounted to the housing, said remote moving means operably couplable to the movable member and adapted to remotely move the movable member from its second position to its first position wherein the movable member comprises a rotatable shaft having a lever fixed thereto, and c) a hub rotatably mounted to the shaft, the hub being adapted and configured to permit the shaft to freely rotate within the hub when the shaft rotates from its first position to its second position the hub being further adapted and configured to engage the shaft and rotate the shaft from its second position to its first position when the hub is rotated.

10. A device as defined in claim 9 wherein the remote moving means comprises an electric drive, said electric drive comprising an electric motor operatively coupled to said lever, said motor also being operatively coupled to a remote station such that said remote station can activate the electric drive to reset the recloser.

11. A device as defined in claim 10 wherein the means for coupling the electric drive to a remote operator comprises an electronic interface coupled to the electric motor, the electronic interface being couplable to the remote station by a communication line.

12. A device as defined in claim 9 further comprising a shaft extension member having a first end adapted to be rigidly fixed to a projecting end of the shaft and a second end adapted to be manually rotated, the hub being adapted to rotatable mount to the shaft extension and rotate the shaft by rotating the shaft extension.

13. A device as defined in claim 12 wherein the shaft extension and the hub are provided with a rotation limiting means to permit the shaft extension and hub to freely rotate relative to each other between a first and second limit, the rotation limiting means configured such that rotating the hub past the first limit causes the hub to engage the shaft extension and rotate the shaft towards the shafts first position, and rotating the hub towards the second limit causes the hub to engage the shaft extension and rotate the shaft towards its second position.

14. A device as defined in claim 13 wherein the rotation limiting means comprises a tongue in groove connection between the shaft extension and the hub, the edges of the groove limiting the relative rotation of the hub and shaft extension.

15. A device as defined in claim 13 further comprising a sensing means for sensing the position of the hub.

16. A device as defined in claim 15, wherein the sensing means comprises microswitches positioned adjacent to the hub, the hub having one or more protruding pegs configured to trigger the microswitches when the pegs are proximate to a microswitch.

17. A device as defined in claim 15 wherein the means for coupling the electric drive to a remote operator comprises an electronic interface coupled to the electric motor, the electronic interface being coupled to the remote station by a communication line, the electronic interface being coupled to the sensing means, and the electric drive being able to rotate the hub.

18. A device as claimed in claim 17 wherein the sensing means comprises microswitches positioned adjacent to the hub, the hub having one or more protruding pegs configured to trigger the microswitches when the pegs are proximate to a microswitch.

19. A motorized recloser controller for a recloser of a power line, said motorized recloser controller comprising:

a mounting surface;

a shaft gear rotatably mounted on said mounting surface, said shaft gear being provided with spaced apart first and second abutment surfaces which face in opposite rotational directions;

a shaft coaxially mounted with said shaft gear and arranged to rotate between an open position and a closed position, said shaft being provided with an abutment member positioned between said first and second abutment surfaces, such that rotation of said shaft gear in a first rotational direction causes said first abutment surface to abut said abutment member and turn said shaft in said first rotational direction, and rotation of said shaft gear in a second rotational direction causes said second abutment surface to abut said abutment member and turn said shaft in said second rotational direction;

a motor operatively engaged to said shaft gear, said motor arranged to selectively rotate said shaft gear in one of said first and second rotational directions, upon receipt of a control signal from a remote location; and at least one limit switch operatively connected to said motor and arranged to sense when said shaft gear reaches a predetermined position; wherein when the shaft is in said open position, upon receipt of a first control signal, the motor first turns the shaft gear in said first rotational direction, thereby causing said first abutment surface to abut the abutment member and rotate said shaft to said closed position, and then turns the shaft gear in said second rotational direction until said first abutment surface is sufficiently spaced apart from said abutment member such that said shaft can freely return to the open position.

20. The motorized recloser controller of claim 19 comprising at least two limit switches, wherein a first limit switch is arranged to sense when the shaft gear rotates the shaft in the first rotational direction to the open position; and a second limit switch is arranged to sense when the shaft gear rotates the shaft in the second rotational direction to the closed position.

21. A remotely resettable recloser for a power line, said recloser comprising:

a motorized recloser controller comprising:

a mounting surface;

a shaft gear rotatably mounted on said mounting surface, said shaft gear being provided with spaced apart first and second abutment surfaces which face in opposite rotational directions;

a shaft coaxially mounted with said shaft gear and arranged to rotate between an open position and a closed position, said shaft being provided with an abutment member positioned between said first and second abutment surfaces, such that rotation of said shaft gear in a first rotational direction causes said first abutment surface to abut said abutment member and turn said shaft in said first rotational direction, and rotation of said shaft gear in a second rotational direction causes said second abutment surface to abut said abutment member and turn said shaft in said second rotational direction;

a motor operatively engaged to said shaft gear, said motor arranged to selectively rotate said shaft gear in one of said first and second rotational directions, upon receipt of a control signal from a remote location; and at least one switch operatively connected to said motor and arranged to sense when said shaft gear reaches a predetermined position; wherein when the shaft is in said open position, upon receipt of a first control signal, the motor first turns the shaft gear in said first rotational direction, thereby causing said first abutment surface to abut the abutment member and rotate said shaft to said closed position, and then turns the shaft gear in said second rotational direction until said first abutment surface is sufficiently spaced apart from said abutment member such that said shaft can freely return to the open position; and a manually manipulable lever fixed to said shaft and mutually movable therewith such that movement of the lever turns said shaft and movement of said shaft turns said lever; said lever and shaft being movable between said open and closed positions by manual activation of said lever and also by remote activation of said motor, wherein upon detection of a fault condition, the shaft and lever are moved from the closed position, in which an electrical current normally passes through said recloser, to the open position.

22. A device for providing an electrical connection in a power line, said device comprising:

a circuit recloser having a tank portion containing a fluid, a head casting fixed to said tank portion, insulated bushings connected to said head casting and a manually manipulable lever accessible from outside said tank portion and head casting, said manually manipulable lever being arranged to control an electrical connection within said tank portion; and a motorized recloser controller fixed to said circuit recloser, said motorized recloser controller including a motor operatively engaged to said lever, wherein said lever is movable between an open position and a closed position by manual activation of said lever and also by remote activation of said motor via an electrical cable.

* * * * *